United States Patent [19]

Piber

[11] 3,971,908

[45] July 27, 1976

[54] SNAP-IN ARRANGEMENT FOR MOUNTING DEVICES IN A SUPPORT PANEL APERTURE

[75] Inventor: Earl T. Piber, Oconomowoc, Wis.

[73] Assignee: Cutler-Hammer, Inc., Milwaukee, Wis.

[22] Filed: Apr. 3, 1975

[21] Appl. No.: 564,747

[52] U.S. Cl. .............................. 200/296; 248/27 A
[51] Int. Cl.² ........................................ H01H 9/02
[58] Field of Search ..................... 248/27 R, 27 A; 200/295, 296, 339, 153 G

[56] References Cited
UNITED STATES PATENTS

| | | | |
|---|---|---|---|
| 2,223,673 | 12/1940 | Catron | 200/295 |
| 2,889,125 | 6/1959 | Hart | 248/27 A |
| 3,319,909 | 5/1967 | Goslin | 248/27 A |

*Primary Examiner*—Gerald P. Tolin

[57] ABSTRACT

The snap-in arrangement includes a retainer slidably mounted on a bushing extending from a switch frame mounted on the switch base of an electrical toggle switch and pivotally supporting a toggle lever for actuating switch contacts housed in the switch base. The bushing is adapted to be inserted through an aperture in a support panel and has a main body, an enlarged outer end portion including an annular ledge extending radially outwardly from the outer surface of the main body, an annular slot in the underside of the ledge, and an inner end portion of a reduced diameter. The retainer has an annular base slidably mounted on the inner end portion of the bushing and a plurality of resilient fingers connected to and normally extending axially in an outwardly diverging direction from the retainer base with the free ends thereof extending radially outwardly beyond the outer periphery of the enlarged end portion of the bushing. The free ends of the fingers are releasably held in the bushing slot prior to mounting.

During insertion of the bushing through the panel aperture, an annular flange on the retainer base abuts the back of the panel and continued axial movement of the bushing relative to the retainer causes the free ends of the fingers to be released from the slot, allowing the fingers to spring outwardly to their normally expanded positions. The biasing force of a coiled spring encircling the retainer, with one end bearing against the switch frame and the other end bearing against the back of the panel, wedges the expanded fingers between the outer corner of the bushing ledge and the inner wall of the panel aperture to lock the device on the panel.

7 Claims, 4 Drawing Figures

SNAP-IN ARRANGEMENT FOR MOUNTING DEVICES IN A SUPPORT PANEL APERTURE

BACKGROUND OF THE INVENTION

This invention provides a push-in or snap-in arrangement for mounting a device in a hole or aperture of a support panel and, more particularly, to such arrangements adapted for use with electrical devices, such as a toggle switch or the like.

Push-in or snap-in arrangements for mounting devices, such as electrical switches or other electrical components, are known. Many prior art arrangements involve either relatively complex constructions, require special tools for mounting and/or provide relatively low retention or holding strength when a circular or round mounting hole is used.

SUMMARY OF THE INVENTION

An object of the invention is to provide a simple push-in or snap-in arrangement for mounting a device in an aperture in a support panel that is particularly adaptable for an electrical switch and the like and is arranged to facilitate simple and quick installation into the mounting hole without special tools.

Another object of the invention is to provide a push-in or snap-in arrangement for mounting a device on a support panel that may be pressed into a round mounting hole from the back of the panel and provide a high retaining strength after mounting.

Other objects, aspects and advantages of the invention will become apparent upon reviewing the following detailed description, the drawing and the appended claims.

The snap-in arrangement provided by the invention includes a retainer slidably mounted on an elongated bushing which is adapted to be inserted through the aperture of a support panel and has a main body, an enlarged outer end portion including a ledge extending radially outwardly from the outer surface of the main body and terminating in an outer corner, and an annular slot located in the underside of the ledge. The retainer includes an annular base slidably mounted on the bushing, a plurality of resilient fingers which are connected to and normally extend radially in an outwardly diverging direction from the base and are radially compressible inwardly to a position where the outer free ends are releasably held in the bushing slot prior to mounting, and an abutment means adapted to abut the backside of the panel during mounting.

During insertion of the bushing through the panel aperture, the abutment means abuts the back of the panel and continued axial movement of the bushing relative to the retainer causes the free ends of the fingers to be released from the slot allowing the fingers to spring outwardly to their normally expanded position. A biasing means is provided for urging the bushing in an axial direction away from the back of the panel to wedge the expanded fingers between the outer corner of the ledge and the inner wall of the panel aperture and thereby lock the device on the panel.

DESCRIPTION OF THE PREFERRED EMBODIMENT

Figure 1:
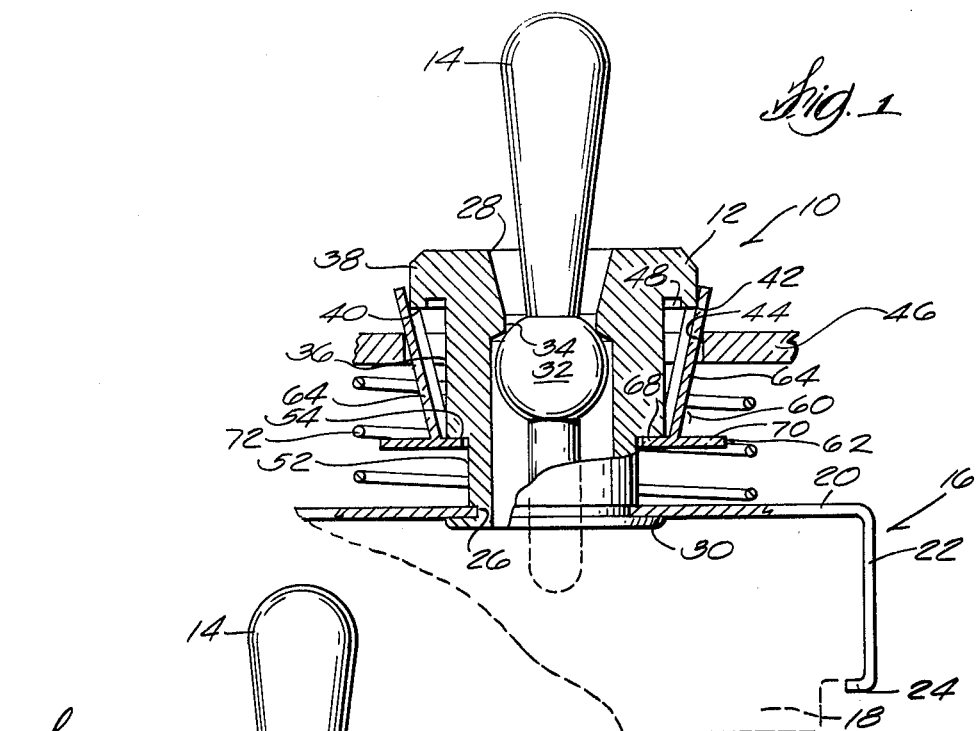
FIG. 1 is an enlarged fragmentary, partially sectioned, side elevational view of a one-hole, snap-in toggle switch embodying various of the features of the invention, shown with the switch mounted on a bulkhead or support panel.

Illustrated in the drawing is a toggle switch assembly 10 embodying various of the features of the invention. The toggle switch assembly 10 includes an elongated bushing 12 having a generally circular cross section, a toggle lever 14, a switch frame 16 (fragmentarily illustrated in FIG. 1) and an insulating switch base 18 (fragmentarily illustrated by dashed lines in FIG. 1) which houses electrical contacts (not shown). The toggle lever 14 and the switch base 18 are of conventional design so a detailed illustration and description of the structural features thereof is not necessary for a full understanding of the invention. For example, the Miller U.S. Pat. No. 3,146,330, issued Aug. 25, 1964, discloses a toggle switch assembly including a toggle lever and switch base arrangement adaptable for use in the invention.

The switch frame 16 has a generally rectangular top 20 and a pair of depending legs 22 (one shown in FIG. 1), one at each end. Located on the lower end of each leg 22 is one or more tabs 24 which, upon assembly of the switch frame 16 and the switch base 18, are bent over into an engagement with the switch base to secure the switch frame on the switch base with the top 20 covering the open top of the switch base.

The bushing 12 is mounted on and extends outwardly from the switch frame 16 coaxially with a circular aperture 26 provided in the switch frame (FIG. 1). The bushing 12 has a central bore 28 for receiving the toggle lever 14. Located on the lower or inner end of the bushing 12 is a relatively thin, annular extension 30 which, upon assembly of the bushing on the switch frame, is swaged into engagement with the underside of the switch frame to securely fasten the bushing to the switch frame.

The toggle lever 14 has an external handle and extends through the bushing 12 with the lower or inner end thereof extending into the switch base 18 for actuation of the switch contacts, for example, as disclosed in the above-identified Miller Patent. The toggle lever 14 also includes an enlarged spherical portion 32 which bears against a constricted portion 34 of the bushing bore 28 to afford pivotal movement of the toggle lever relative to the bushing during actuating movement.

The bushing 12 includes a generally cylindrical main body 36, an enlarged tip or outer end portion 38 having an annular ledge 40 extending radially outwardly from the outer surface of the main body 36 and terminating in an outer corner 42. The outer diameter of the outer end portion 38 of the bushing 12 is less than the inside diameter of a circular mounting hole 44 in the bulkhead or support panel 46 on which the switch assembly 10 is to be mounted. For example, the outside diameter of the bushing end portion 38 can be about 0.10 to 0.20 inch less than the inside diameter of the panel mounting hole 44. Provided on the underside of the ledge 40 adjacent the main body 36 is an annular slot 48. The bushing 12 preferably also includes an inner end portion 52 of a reduced diameter and having an annular shoulder 54 extending radially inwardly from the outer surface of the main body 36 for purposes discussed below.

Figure 2:
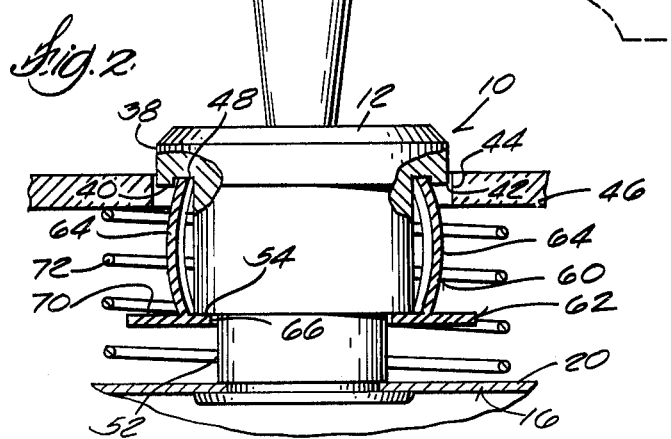
FIG. 2 is a view similar to FIG. 1 showing the position of the various components during initial installation of the toggle switch bushing into a mounting hole in the panel.
Figure 4:
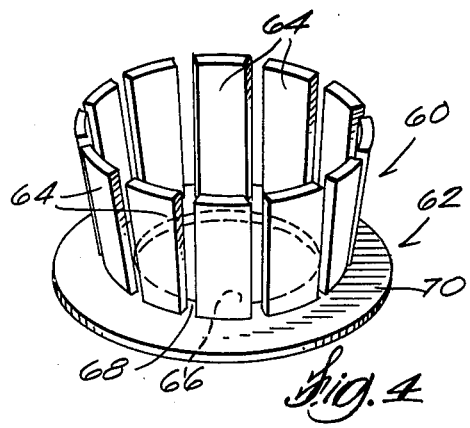
FIG. 4 is a perspective view of the retainer.
Figure 3:
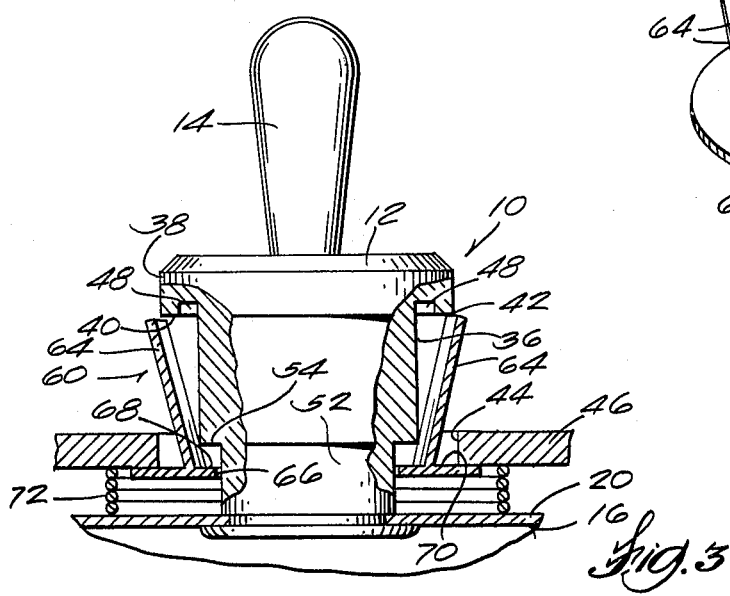
FIG. 3 is a view similar to FIGS. 1 and 2, showing the position of the various components after the toggle switch bushing has been pushed through the panel mounting hole a sufficient distance to release the retainer fingers.

Slidably mounted on the inner end portion 52 of the bushing 12 is an expandable, snap-in retainer 60 including a generally flat, annular base 62 and a plurality of resilient fingers 64 connected to and normally extending axially in an outwardly diverging direction from the base 62. The outer free ends of the fingers 64 normally extend radially outwardly beyond the outer periphery of the enlarged outer end portion 38 of the bushing 12 and also beyond the inner periphery of the panel mounting hole 44 as shown in FIGS. 1 and 3. The fingers 64 are made from a suitable spring material of sufficient flexibility to permit the outer free ends thereof to be compressed radially inwardly and releasably held in the annular slot 48 as shown in FIG. 2. The retainer base 62 includes a central circular aperture 66 for slidably receiving the inner end portion 52 of the bushing 12, an inner annular flange 68 and an outer annular flange 70 which has an outer dimension larger than the inside dimension of the panel mounting hole 44 and abuts the back of the panel 46 during mounting as explained below.

A compression spring member is positioned to be compressed between the top 20 of the switch frame 16 and the back of the panel 46 and to act as a back-up spring after the switch assembly 10 has been mounted on the panel. In a specific construction illustrated, such a spring member comprises a coiled or helical spring 72 positioned to encircle the retainer 60 with the inner end abutting the top 20 of the switch frame 16 and the outer end adapted to abut the backside of the panel 46. Suitable means can be provided for fastening the inner end of the spring 72 to the switch frame 16, such as by welding, to retain the spring in place prior to mounting the switch assembly 10 on the panel.

To assemble the switch assembly 10 ready for mounting from the rear of the panel 46 as shown in FIG. 2, the retainer 60 is slipped over the inner end portion 52 of the bushing 12 before the bushing is mounted on the switch frame. After the bushing has been secured to the switch frame, the spring fingers 64 are compressed radially inwardly and the retainer base 62 moved axially on the bushing 12 (upwardly as viewed in FIGS. 1–3) so that the outer free ends of the spring fingers 64 are lodged within and are releasably held by the annular slot 48 in the ledge 40 as shown in FIG. 2.

The retainer 60 is retained in a ready-to-mount position by the combined effect of the biasing force of the spring fingers 64 acting against the outer wall of the slot 48 and the inner flange 68 of the retainer base 62 bearing against the bushing shoulder 54 to limit axial movement of the retainer on the bushing 12. The axial distance between the shoulder 54 and the slot 48 is dimensioned so that the outermost dimension of the bowed spring fingers is smaller than the inside diameter of the panel mounting hole 44 as shown in FIG. 2. The spring 72 is then dropped over the bushing 12 and the retainer 60 and, if fastening means is used, the lower end thereof is fastened to the top 20 of the switch frame 16.

Upon insertion of the bushing 12 through the panel mounting hole 44 during mounting, the outer end of the spring 72 abuts the back of the support panel 46. During continued axial movement of the switch assembly 10 against the biasing force of the spring 72, the outer flange 70 of the retainer base 62 abuts the back of the panel causing the bushing 12 to be moved axially relative to the retainer so that the spring fingers 64 are released from the slot 48 and the fingers 64 spring radially outwardly to their normally expanded or extended position as shown in FIG. 3. When the siwtch assembly 10 is thereafter released, the biasing force of the spring 72 moves the bushing 12 axially in a direction away from the back of the support panel causing the rim of the panel mounting hole to engage the diverging spring fingers and stop movement of the retainer with the fingers flared out around the hole. Continued axial movement of the bushing relative to the retainer causes the spring fingers 64 to become wedged or sandwiched between the outer corner 42 of the ledge 40 and the inner wall of the panel mounting hole 44 as shown in FIG. 1 to thereby retain the bushing 12 in tight holding engagement with the support panel. In addition to serving as a retention means, the spring fingers 64 also center the bushing 12 within the panel mounting hole 44.

For proper indexing of the switch assembly 10 and/or to prevent the switch assembly from rotating relative to the panel after mounting, the panel mounting hole 44 normally is provided with a key or lug (not shown) which fits into an axially extended keyway (not shown) provided along one side of the bushing 12. In this case, two of the spring fingers 64 are circumferentially spaced apart a sufficient distance to accommodate the key in the panel mounting hole.

While the invention has been illustrated in connection with a bushing having a circular cross section and a circular support panel mounting hole, it should be apparent that other shapes can be used so long as the retainer spring fingers extend substantially continuously around the periphery of the mounting hole so as to provide the desired wedging action. Also, actuators other than toggle levers can be used.

While the preferred embodiments of the invention have been illustrated and described in detail, it will be apparent to those skilled in the art that various changes and modifications can be made thereto to adapt the invention to various uses without departing from the scope of the appended claims.

I claim

1. A snap-in mounting assembly for an electrical device adapting the device to be mounted from the back of and through an aperture in a support panel to secure the device to the panel so that an operator element of the device is accessible from the front of the panel comprising an elongated bushing carrying the operator element of the device and inserted through a panel aperture, said bushing having a main body, an enlarged outer end portion including an inner ledge extending radially outwardly from the outer surface of said body and terminating in an outer corner, and an annular slot located in the underside of said ledge;

a retainer having an annular base slidably mounted on said bushing for relative axial and axially movable thereon, a plurality of resilient fingers connected to and normally extending axially in an outwardly diverging direction from said base and being radially compressible between a normally expanded position where their outer free ends extend radially outwardly beyond the outer periphery of said bushing outer end portion and beyond the inner periphery of the panel aperture and a radially inwardly compressed position where their outer free ends are releasably held in said slot prior to mountig the electrical device on the panel, and said retainer has abutment means removing abutting the back of the panel to limit axial movement of said retainer relative to the panel as said bushing is inserted into the panel aperture during mounting so that, upon continued axial movement of said bushing through the panel aperture, axial movement of said bushing relative to said retainer causes said free ends of said fingers to be released from said slot, allowing said fingers to return to said expanded position; and means for biasing said bushing in an axial direction away from the back of the panel to wedge said fingers between said ledge outer corner and the inner wall of the panel aperture, thereby locking the device on the panel.

2. A snap-in mounting assembly according to claim 1 wherein said abutment means comprises an outer annular flange on said retainer base extending radially outwardly from said connected ends of said fingers and beyond the rim of the panel aperture.

3. A snap-in mounting assembly according to claim 2 including means for limiting axial movement of said retainer relative to said bushing in a direction towards said outer end portion of said bushing.

4. A snap-in mounting assembly according to claim 3 wherein said limiting means comprises a recessed portion on the inner end portion of said bushing on which said retainer base is slidably mounted and which includes an annular shoulder extending radially inwardly from the outer surface of said body, and an inner annular flange on said retainer base extending radially inwardly beyond said connected ends of said fingers for abutting said shoulder.

5. A snap-in mounting assembly according to claim 1 wherein the electrical device is a toggle switch including a base housing switch contacts and a switch frame mounted on said switch base;

said bushing is mounted on and extends outwardly from said switch frame and pivotally supports the operator element which is a toggle lever for actuating said contacts; and said biasing means comprises a compression spring member having one portion bearing against said switch frame and another portion adapted to bear against the back of the panel.

6. A snap-in mounting assembly according to claim 5 wherein said spring member comprises a coiled spring encircling said retainer with one end secured to said switch frame and the other end adapted to abut the back of the panel.

7. A snap-in mounting assembly according to claim 6 wherein said abutment means comprises an outer annular flange on said retainer base extending radially outwardly from said connected ends of said fingers and beyond the rim of the panel aperture;

said bushing, on the inner end portion thereof, has a recessed portion on which said retainer base is slidably mounted and which includes a shoulder extending radially inwardly from the outer surface of said body; and said retainer base includes an inner annular flange extending radially inwardly beyond said connected ends of said fingers for abutting said flange and limiting the axial movement of said retainer relative to said bushing in a direction towards said outer end of said bushing.

* * * * *

UNITED STATES PATENT OFFICE
CERTIFICATE OF CORRECTION

PATENT NO. : 3,971,908
DATED : July 27, 1976
INVENTOR(S) : Earl T. Piber

It is certified that error appears in the above—identified patent and that said Letters Patent are hereby corrected as shown below:

In claim 1, column 4, line 54, between "the" and "device" insert --- electrical ---.

In claim 1, column 4, line 62, delete "for relative axial."

In claim 1, column 5, line 5, delete "mountig" and insert --- mounting ---.

Signed and Sealed this

Twenty-first Day of December 1976

[SEAL]

Attest:

RUTH C. MASON
Attesting Officer

C. MARSHALL DANN
Commissioner of Patents and Trademarks